Oct. 21, 1969    R. E. OBERLIN    3,473,938
PROCESS FOR MAKING HIGH STRENGTH REFRACTORY STRUCTURES
Filed April 5, 1968

INVENTOR
ROBERT E. OBERLIN

BY Lynn M. Disher
ATTORNEY 3,473,938
PROCESS FOR MAKING HIGH STRENGTH REFRACTORY STRUCTURES
Robert E. Oberlin, Wilmington, Del., assignor to E. I. du Pont de Nemours and Company, Wilmington, Del., a corporation of Delaware
Continuation-in-part of application Ser. No. 367,856, May 15, 1964. This application Apr. 5, 1968, Ser. No. 719,064
Int. Cl. C04b 35/10, 33/00
U.S. Cl. 106—57                                     3 Claims

ABSTRACT OF THE DISCLOSURE

Ceramic structures are made by coating thin aluminum sections with a composition containing a vanadium compound and an alkali metal or alkaline earth silicate, firing the coated sections between 600 and 900° C. for over 8 hours and then over 900° C. to oxidize the aluminum.

CROSS REFERENCE TO RELATED APPLICATIONS

This application is a continuation-in-part of my copending application Ser. No. 367,856, filed May 15, 1964, now abandoned.

BACKGROUND OF THE INVENTION

This invention is concerned with the preparation of refractory bodies by the in situ oxidation of aluminum. More particularly the invention relates to the use of a vanadium compound in the process thereby providing refractory bodies having higher strength and greater thermal shock resistance.

The firing of aggregates or templates of aluminum and other materials to alumina containing refractory structures is taught in U.S. Patent 3,255,027 to Talsma. The products of that patent have excellent properties in general. These properties are related to the integral skeleton of refractory material that surrounds voids corresponding to the shape and size of the original aluminum sections used in the process. When an assembly of thin aluminum sheets, e.g., a honeycomb structure, is used in the process in the absence of any structural extending material, a double-walled structure is produced. This product has excellent strength and good thermal shock resistance and represents a notable advance over conventional ceramic products. However, for some applications higher strength and even greater thermal shock resistance are needed than the double-wall structure can provide.

SUMMARY OF THE INVENTION

In accordance with this invention, an alumina containing thin-walled refractory structure of high strength and thermal shock resistance is made by coating a structure of thin aluminum sections with a composition containing 2 to 25% by weight, calculated at $V_2O_5$, of a vanadium compound having a melting point above 600° C., 10% to 98% by weight of a fluxing agent selected from the alkali metal and alkaline earth silicates and 0 to 90% of a refractory material or its precursor selected from the group consisting of alumina, magnesia, chromia, titania, zircon, magnesium silicate, aluminum silicate and aluminum powder, firing the coated structure in an oxygen atmosphere at a temperature of 600 to 900° C. for over 8 hours and then firing in an oxygen atmosphere at temperature from 900° C. to slightly below the melting point or softening point of the structure for over 10 hours.

DETAILED DESCRIPTION OF THE INVENTION

Figure 2:
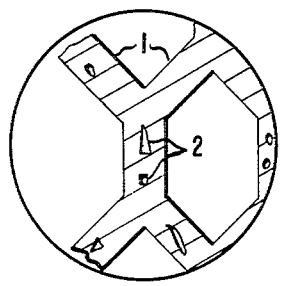
FIGURE 2 is an enlarged cross-section of that portion of the alumina honeycomb encircled in FIGURE 1. The wall of alumina 1 is substantially solid, having only occasional void portions 2.

The structures of thin aluminum sections useful in the process of the invention can have many forms, such as cans, tubes, boxes, arrays of tubes, honeycombs, etc., or crumpled forms can be made from aluminum sheets or formed by extrusion methods. Aluminum, the usual high aluminum alloys and alloys in which aluminum constitutes the major part can be used. The aluminum sections will have a thickness of between about 0.025 and 3.2 mm. The most useful products are made from aluminum of between 0.05 and 0.9 mm. thickness. The aluminum sections can be solid, perforated or foamed.

The aluminum structures are preferably clean from oil and other such contaminants which can interfere with good adhesion of a coating. The coating should firmly adhere to the aluminum during the firing in order to achieve the desired result. Etching with dilute hydrochloric acid or sodium hydroxide is a convenient way of cleaning the surface of the metal.

After the etching, the aluminum structure is coated with the slurry containing the vanadium compound and the fluxing agent.

The coating to be applied to the substrate structure of aluminum sections should contain at least 2% by weight on a dry basis of the vanadium compound (calculated as $V_2O_5$) and preferably between about 2.0 and 25% will be present.

The vanadium compound must be present during the oxidation of the aluminum and hence should have a melting point above about 600° C. Thus any vanadium compound which meets this melting point requirement can be used. Vanadium pentoxide and salts of metavanadic acid ($HVO_3$) are particularly useful. Elemental vanadium or vanadia can be used in the coating to provide the vanadium compound required. An alloy of aluminum and vanadium in the form of powder is convenient.

The coating slurry must also contain an alkali metal or alkaline earth silicate as the "fluxing agent." The principal function of the fluxing agent is to act as a promoter for the oxidation of the aluminum during the firing step. In addition, the silicates serve as a bonding or film producing agent which enhances the stability of the coating until the green, i.e., coated but unfired, structure is fired. U.S. Patent 3,255,027 discloses numerous other materials which will act as fluxing agents, or promoters, for the oxidation of aluminum and any of these could be used instead of the alkali metal or alkaline earth silicates. However, the latter are preferred because of their effectiveness in promoting the reaction and because of the multiple functions they serve.

The alkali metal silicate is ordinarily used in the form of an aqueous solution. For example, where sodium silicate is used a commercially available 41° Bé. solution containing about 38% solids and having a sodium oxide to silica ratio of about 1:3.25 is suitable. Comparable potassium silicate solutions are also available commercially. The use of these alkali metal silicates, e.g., sodium, potassium, lithium, is preferred over the use of the alkaline earth silicates.

The coating composition can comprise solely the vanadium compound and the silicate, i.e., from about 75 to 98% of the silicate on a dry basis, on the other hand, only from 10 to 60% of the silicate need be employed and other refractory components can be present, in order to alter the composition or nature of the final product. Alumina as such, or in the form of aluminum powder can be added to the coating to be applied to extend the thickness of the final body. Magnesia, chromia, titania, silica, zircon, the various magnesium silicates, and aluminum silicates can be used to alter the composition of the final body and to extend its bulk. Such materials can be added in amounts so as to constitute up to about 90% (preferably 20 to 70%) of the dry but unfired coating weight. Of this grouping of materials, aluminum powder gives particularly desirable results.

Suitable coating compositions can be provided by merely blending the ingredients in the proper proportions and adding water to give a suitable consistency for coating.

The coating should retain its shape and physical characteristics during the firing at 600° to about 900° C. and should firmly adhere to the surface of the aluminum and the reaction products during the process.

The addition of viscosity-controlling substances and/or green binding agents to the coating composition is often advantageous and frequently necessary with coating bases that do not provide adequate adhesion until firing temperatures are reached. Substances such as clay, sodium alginate, sodium carboxymethyl cellulose, natural gums, polysaccharides, synthetic resins (e.g., polyvinyl alcohol) and the like, are suitable. The amount of such substances is not critical and can vary between 0.1 and 50% (preferably 1 to 3%) of the total weight of the dry coating composition.

The coating compositions are most conveniently applied as aqueous dispersions or slurries. For some purposes an organic solvent might be preferred.

The coatings can be applied to the preformed structure (e.g., a honeycomb) as by dipping or it can be applied to aluminum sheets which are fabricated to the desired structure after coating. In the latter case, the coating can be applied by dipping, brushing, spraying, etc., to the aluminum base.

Single or multiple coatings can be applied. The dried coating can amount to from 5 to 99.9% (preferably 50 to 95%) of the total weight of the aluminum structure and coating. The coatings can range in thickness (on one side of an aluminum section) from 0.01 to 6.5 mm.

After the coating step, the structure is dried for a period of several minutes up to about an hour in a forced draft ambient air. Normally a period of about ¾ of an hour is sufficient for thoroughly drying the products.

The dried, coated objects are fired in an oxygen-containing atmosphere to oxidize the aluminum.

The essential part of the firing is done at a temperature of about 600 to 900° C. for a period of time to oxidize at least about 10% (preferably at least 90%) of the total aluminum present. This oxidation step provides the solid, continuous structure and prevents excessive migration of the aluminum whereby large voids are formed and/or aluminum melts out of the structure.

The second stage of the firing is carried out from about 900° C. to a temperature (e.g., 1500–1600° C.) below that of the melting point of the structure for a period of time to substantially complete the oxidation of the aluminum and to form compounds such as spinel or mullite if desired.

The exact firing schedule will depend upon the thickness of the aluminum, the amount of vanadium compound present and the amount and nature of the other materials present. In general, with aluminum sheets of 0.13 mm. or less in thickness, heating from 600 to 900° C. over a period of from 8 to 36 hours is satisfactory for the first stage and a period of from 10 to 24 hours over the range from 900° C. to 1600° C. for the second stage is satisfactory. For thickness greater than 0.13 mm. longer cycles are required. Preferably the firing is done without cooling between stages.

Products of this invention are integral structures of thin-walled sections of refractory material having high strength and thermal shock resistance.

Figure 3:
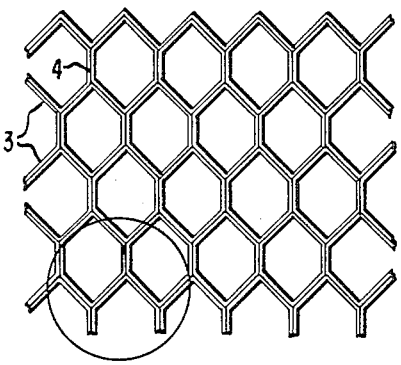
FIGURE 3 is a cross-section of an alumina honeycomb made by the in situ oxidation process of U.S. Patent 3,255,027 to Talsma.
Figure 4:
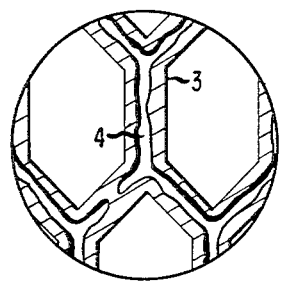
FIGURE 4 is an enlarged cross-section of that portion of the alumina honeycomb encircled in FIGURE 3. This figure illustrates that the void 4 created during the patented process extends substantially throughout the alumina 3, thereby creating a double walled structure.

The products of Talsma U.S. Patent 3,255,027 are characterized by having a double-walled structure as illustrated in FIGURE 3 and FIGURE 4. The double wall results from the fact that the aluminum sections, as they melt, flow outwardly through the oxide film formed on their outer surfaces and are oxidized at the outer surface of the oxide layer, thus leaving a large void in the final product corresponding approximately in thickness to the thickness of the original aluminum section. The inclusion of the vanadium compound in the coating composition causes the formation of bridges of alumina between these double walls resulting in a product having even greater strength and thermal shock resistance than Talsma's products. Thus by acting to eliminate or bridge the voids in the walls, the vanadium compounds serve the function of a structure determining ingredient.

Although this theory is not free from doubt, it is thought that during the low temperature firing, i.e., firing at 600–900° C., the vanadium compound carries oxygen for the in situ oxidation of the aluminum metal, thus building bridges of alumina across the void that occurs in the Talsma process when the molten aluminum must move outwardly to find oxygen.

The products produced according to the present invention have significant utility as high temperature insulation panels, heat exchangers, radiant burners, regenerators and catalyst carriers and supports.

In the following examples, all sieve measurements are made with U.S. Sieve Series. The expression "—X mesh" indicates the particles all pass through an X mesh sieve. The expression "X/Y mesh" indicates that all particles pass through an X mesh sieve and are retained on a Y mesh sieve.

Porosity is calculated by the relation $$\frac{d_t - d_b}{d_t} \times 100$$

where $d_t$ is the true density of the body (based on composition) and $d_b$ is the bulk density (total weight/total volume, including pores). All densities presented in the examples are bulk densities.

Example 1

A coating composition is made of 100 grams sodium metavanadate ($NaVO_3$), 1390 grams of sodium silicate solution, 1000 grams of aluminum powder and 1000 ml. of a 1% aqueous solution of sodium carboxymethyl cellulose.

The sodium silicate is a commerical sodium silicate, 40° Bé., ca. 38% solids ($Na_2O:SiO_2$ of 1:3.25).

The aluminum powder is a commercial grade (99+% Al) of —140 mesh. It serves as a thickening agent for the coating and as a source of additional potential alumina.

The sodium metavanadate is a C.P. grade ($NaVO_3$) of —100 mash.

A commercially available aluminum honeycomb with 0.187 (0.475 cm.) "diameter" cells made from aluminum alloy 5052 (2.5% magnesium) of .003" (0.0076 cm.) thickness is used as a starting material.

Portions of the honeycomb having 1.5" (3.8 cm.) long cells are dipped into the above coating composition, drained and air dried. This is repeated 3 times until a dried coating of about 0.08" (0.2 cm.) thick (on each side of the metal sections) is obtained. The weight of the dry coating is about 90% of the total weight of coating and honeycomb.

The coated honeycomb is dried for 24 hours at room temperature and then fired to 1600° C. over a 5 to 6 day period as follows:

50° C. to 600° C. in 7.3 hours
600° C. to 800° C. in 2.7 hours
800° C. to 900° C. in 10.8 hours
900° C. to 1400° C. in 54 hours
   at 1400° C. for 15 hours
1400° C. to 1600° C. in 35 hours all increases being at a uniform rate over the stated range.

The product (a) is a refractory honeycomb that closely corresponds to the shape of the original structure. The cells are straight and undistorted and form a strong unitary structure.

The walls of the honeycomb are about 0.10 cm. thick and have a bulk density of 1.70 g./cm.$^3$. The entire structure has a bulk density of 0.59 g./cm.$^3$.

Examination of a polished section shows a porous refractory consisting mainly of alpha alumina and a lesser amount of mullite. No metallic aluminum is present. The pores are distributed substantially uniformly through the structure with a maximum diameter of about 0.001" (0.0254 mm.).

Figure 1:
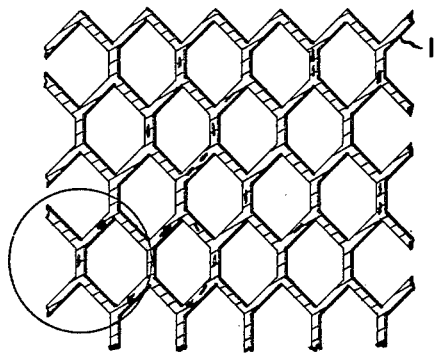
FIGURE 1 is a cross-section of an alumina honeycomb made by the process of this invention.

The cross section is substantially a single wall structure, such as illustrated in FIGURE 1 and FIGURE 2.

For comparative purposes an alumina honeycomb is prepared as above but using a coating composition consisting of equal parts by weight of aluminum powder, hydrated alumina powder ($Al_2O_3 \cdot H_2O$), 40° Bé. sodium silicate, and a 1% aqueous solution of sodium carboxymethyl cellulose.

The fired product (b) is about equivalent to product (a) above in shape retention, appearance and strength in a direction along the cells.

Examination of a polished section of product (b) shows a porous wall of alpha alumina enclosing a void with a thickness (in section) about the same as the thickness of the original metal sheets in the honeycomb. This section corresponds to FIGURE 2.

Portions of products (a) and (b) (about 3 x 4", 7.6 x 10.3 cm.) are mounted in adjacent positions in a panel and alternately heated for 10 minutes to 1200° C. by passing furnace exhaust gases through the cells of the honeycombs and then cooled for 10 minutes with a strong, continuous blast of air at room temperature through the cells. After 10 complete cycles of this drastic test, product (b) has seriously deteriorated. Sections of the cells fall off when the sample is removed from the test panel. Cells can be easily separated from the edges of the sample with one's fingers. Product (a) retains its structural integrity and strength through the test. No portions are lost upon handling and cells cannot be separated by finger pressure.

Example 2

A coating composition is made of one part of sodium metavanadate, 10 parts of 40° Bé. sodium silicate, 20 parts of aluminum powder and 4.5 parts of water with all parts expressed as weight. The chemicals of Example 1 are used.

An aluminum honeycomb with 0.75 inch (1.9 cm.) "diameter" cells made from aluminum alloy 5052 of 0.004" (0.01 cm.) thickness is used as a base. A piece of the honeycomb having 2" (5.08 cm.) long cells is provided with 7 coats of the composition amounting to about 1000% (dry basis) of the weight of the aluminum. The coating is approximately 0.8 mm. thick on each side of an aluminum section. The sample is dried and fired as in Example 1.

The fired product has a bulk density of about 0.42 g./cm.$^3$ and faithfully reproduces the shape of the aluminum original. The walls of the structure are about 2 mm. thick. Examination of a cut section shows the single wall structure of item (a) of Example 1 composed primarily of alpha alumina; there are essentially no voids surrounded by double walls. Emission spectrograph of a sample gives the following elemental analysis: Al 15–75%, Si 1–5%, Na 0.5–2% and V 0.5–2%.

The above procedure is repeated with the use of a different firing rate as follows:

50° C. to 600° C. in 7.8 hours
600° C. to 900° C. in 4.0 hours
900° C. to 1550° C. in 8.7 hours
   at 1550° C. for 2 hours all increases being at a uniform rate.

This fast-fired product contains a large void of about 0.12 mm. wide (in a section) running the length of the section having frequent bridges of refractory material across the long central void.

Example 3

A sample of the coated but unfired product (b) of Example 1 is dipped in slurry of vanadium pentoxide in ethanol and dried. It is fired to about 850° C. over a 5-day period and then to 1400° C. over a 2-day period.

The walls of the product are predominately single-wall structure as product (a) of Example 1.

Example 4

An aluminum tube 1" (2.54 cm.) long with an outside diameter of 0.75" (1.9 cm.) and a wall thickness of 0.035" (0.89 mm.) is coated with a mixture of 40° Bé. sodium silicate and powdered vanadium pentoxide (about 4/1 weight ratio) by dipping and draining. The coated tube is dried for 12 hours at 120° C. and then fired as follows:

to 650° C. in 8.5 hours
at 680 to 725° C. for 69 hours
at 750° C. for 42 hours
at 800° C. for 7 hours
at 875° C. for 15 hours The sample is then placed in another furnace and fired to 1400° C. over a 5-day period.

The fired product (Item (a)) is a hard refractory tube with walls about 2.4 mm. thick and extremely strong in both radial and vertical directions. Examination of a cut section reveals that the wall has a continuous ceramic structure that is partially porous. X-ray analysis indicates alpha alumina with a lesser amount of mullite as the only crystalline components. An emission spectrograph indicates the following elemental analysis: Al 15–75%, Na 0.1–0.5%, Si 1–5%, and V 0.5–2.0%.

The above procedure is repeated with a mixture of sodium silicate and talc (for item (b)) instead of the sodium silicate-vanadium pentoxide mixture. The fired product has a double wall structure. It is quite strong in the vertical direction but the other wall can be flaked away by probing radially with a steel wire.

Samples of (a) and (b) are heated to 915° C. and then quenched in cold water. Finger pressure on item (b) causes the outside wall to crumble. Item (a) resists crumbling under the same treatment.

Example 5

The procedure of Example 2 is followed except 4 parts powdered magnesium silicate and 4 parts 1% solution of sodium carboxymethyl cellulose are substituted for the 10 parts of 40° Bé. sodium silicate.

The firing cycle is the same, except the 600° to 900° C. period is 16 hours.

The fired product is identical in appearance and microstructure to item (a). Example 1. Chemical composition is changed in that the magnesia appears as alumina spinel.

I claim:
1. A refractory prepared by:
   (1) coating a structure of thin aluminum sections having a thickness of between about 0.025 mm. and 3.2 mm. with a coating composition, such that the dried coating amounts to from 5 percent to 99.9 percent of the total weight of the aluminum sections and coating, said coating composition comprising:
- (a) 2 to 25 percent by weight calculated as $V_2O_5$, of a vanadium compound having a melting point above 600° C.;
- (b) 10 to 98 percent by weight of a fluxing agent selected from the group consisting of alkali metal silicates and alkaline earth silicates; and
- (c) 0 to 90 percent by weight of a material selected from the group consisting of alumina, magnesia, chromia, titania, zircon, magnesium silicate, aluminum silicate, and aluminum powder;

(2) firing the coated structure in an oxygen atmosphere at a temperature of from 600° C. to 900° C. for at least 8 hours; and (3) then firing in an oxygen atmosphere at a temperature of from 900° C. to approaching the melting point of the structure for at least 10 hours.

2. The structure of claim 1 wherein the fluxing agent is sodium silicate.

3. The structure of claim 2 wherein the thin aluminum sections are in the form of a honeycomb.

References Cited

UNITED STATES PATENTS

| | | | |
|---|---|---|---|
| 2,631,353 | 3/1953 | Robinson | 106—65 |
| 3,244,539 | 4/1966 | Hare | 106—65 |
| 3,248,241 | 4/1966 | El Rifai | 106—65 |
| 3,255,027 | 6/1966 | Talsma | 106—65 |
| 3,285,761 | 11/1966 | Hare et al. | 106—65 |
| 3,296,002 | 1/1967 | Hare | 106—65 |

JAMES E. POER, Primary Examiner

U.S. Cl. X.R.

106—40, 62, 63, 65, 66